(12) United States Patent
Makis et al.

(10) Patent No.: US 10,859,206 B2
(45) Date of Patent: Dec. 8, 2020

(54) LOADING AND UNLOADING EQUIPMENT AND PROCEDURE FOR THE OPERATION OF LOADING AND UNLOADING EQUIPMENT

(71) Applicant: SW Automation GmbH, Tettnang (DE)

(72) Inventors: Sven Makis, Langenargen (DE); Metin Kilic, Efrizweiler (DE)

(73) Assignee: SW AUTOMATION GMBH, Tettnang (DE)

( * ) Notice: Subject to any disclaimer, the term of this patent is extended or adjusted under 35 U.S.C. 154(b) by 266 days.

(21) Appl. No.: 16/021,485

(22) Filed: Jun. 28, 2018

(65) Prior Publication Data
US 2019/0011082 A1   Jan. 10, 2019

(30) Foreign Application Priority Data

Jul. 7, 2017   (DE) .................. 10 2017 115 281

(51) Int. Cl.
*B23P 19/04*   (2006.01)
*F16P 3/08*   (2006.01)
(Continued)

(52) U.S. Cl.
CPC ................. *F16P 3/08* (2013.01); *B25J 19/06* (2013.01); *F16P 3/144* (2013.01); *G01V 8/10* (2013.01); *B66F 9/02* (2013.01)

(58) Field of Classification Search
CPC ... B23Q 3/00; B23Q 3/04; B23Q 3/06; B23Q 3/154; B25B 11/00; B23P 11/00; B23P 13/00; B23P 21/00
See application file for complete search history.

(56) References Cited

U.S. PATENT DOCUMENTS

| | | | | |
|---|---|---|---|---|
| 4,845,841 A | * | 7/1989 | Lapeyre | E04F 11/1041 29/791 |
| 2009/0144916 A1 | * | 6/2009 | Honeycutt | B63B 27/14 14/71.1 |

(Continued)

FOREIGN PATENT DOCUMENTS

| | | |
|---|---|---|
| CN | 202499554 U | 10/2012 |
| CN | 104384766 A | 3/2015 |

(Continued)

OTHER PUBLICATIONS

European Search report for corresponding AP application No. 18177597.4-1017, dated Dec. 4, 2018.

(Continued)

*Primary Examiner* — Lee D Wilson
(74) *Attorney, Agent, or Firm* — Bacon & Thomas, PLLC

(57) ABSTRACT

A loading and unloading equipment that includes at least one carrier that essentially runs parallel to the ground, at least one supporting body extending diagonally or at an angle towards the carrier, at least one carriage body that is installed on the carrier, at least one motor that moves the carriage body in a direction of movement along the carrier, at least one loading and unloading device that may be or is set on the carriage body, at least one control device that at least controls the movement of the motor and/or the loading and unloading device, and at least one access device that consists of at least one stair-like or step-like walk-on element, and at least one locking tool, which blocks the access to the walk-on element when set to a locking position and which allows access to the walk-on element when set to a release position.

14 Claims, 2 Drawing Sheets

(51) Int. Cl.
    *G01V 8/10*     (2006.01)
    *F16P 3/14*     (2006.01)
    *B25J 19/06*     (2006.01)
    *B66F 9/02*     (2006.01)

(56) References Cited

U.S. PATENT DOCUMENTS

2014/0203485 A1\*   7/2014   Forlong ................ B23P 11/00
                                                                            269/309
2019/0011082 A1\*   1/2019   Makis ..................... G01V 8/10

FOREIGN PATENT DOCUMENTS

| DE | 3320969 A1 | 12/1984 |
|---|---|---|
| DE | 19649593 A1 | 6/1998 |
| DE | 10334653 A1 | 3/2005 |
| DE | 10 2005 005 906 A1 | 8/2006 |
| EP | 2186761 A1 | 5/2010 |

OTHER PUBLICATIONS

German Search report for corresponding German application 10 2017 0115 281.4 dated Jun. 1, 2018.

\* cited by examiner

LOADING AND UNLOADING EQUIPMENT AND PROCEDURE FOR THE OPERATION OF LOADING AND UNLOADING EQUIPMENT

CROSS REFERENCE TO RELATED APPLICATIONS

This application claims priority to Germany application DE 10 2017 115 281.4, filed Jul. 7, 2017, which is incorporated by reference in its entirety.

The invention relates to loading and unloading equipment that includes at least one carrier that essentially runs parallel to the ground, at least one supporting body extending diagonally or at an angle towards the carrier and setting the carrier in place with space towards the ground, at least one carriage body that is installed on the carrier, at least one motor that moves the carriage body in a direction of movement along the carrier, at least one, in particular multi-axial, loading and unloading device that may be or is set on the carriage body, at least one control device that at least controls the movement of the motor and/or the loading and unloading device, and at least one access device that consists of at least one stair-like or step-like walk-on element, which, at least when set to an operating position, extends from near the ground to the carrier, as well as at least one locking tool, which blocks the access to the walk-on element when set to a locking position and which allows access to the walk-on element when set to a release position. The invention further pertains to a procedure for the operation of such loading and unloading equipment.

BACKGROUND OF THE INVENTION

For example, loading and unloading equipment is known to be a part of a workpiece processing plant, on which at least one loading and unloading device is movable along the carrier as well as positionable in front of individual machine tools, in order to equip and load the relevant machine tool with workpieces, tools or the like, or take the workpieces and tools or such from the machine tool.

With the known loading and unloading equipment, the space between the carrier and the ground is created by supporting bodies. In order to perform maintenance work, for example on the carriage body, on the motor and/or on the loading and unloading device, the known loading and unloading equipment have access devices with a ladder-like walk-on element that is permanently installed on the loading and unloading equipment in a way that allows for operating personnel to get from the ground to the carrier via the walk-on element.

In order to increase the safety of the operating personnel, the known loading and unloading equipment possesses a door-like locking tool, which extends across the walk-on element in a way that blocks the access to the walk-on element, when set to a locking position. The locking tool can, for example, be unlocked by a lock-and-key system as well as switched from the lock position to a release position, in which the locking tool allows access to the walk-on element. Thus, a deliberate access to the walk-on element is promoted and the operating personnel is reminded to turn off the motor and/or the loading and unloading device or prevent them from moving.

SUMMARY OF THE INVENTION

It is one purpose of an embodiment of the invention to propose a loading and unloading equipment as well as a procedure for the operation of such loading and unloading equipment, which facilitates the operating personnel's safe access to the carrier.

In case of the previously mentioned loading and unloading equipment, this purpose if realized by functionally assigning the control device and the locking tool to a safety device, which includes at least a first sensor tool, by the means of which the locking tool's switch from the lock position to the release position is detectable and the motor's and/or loading and unloading device's setting against movement is possible when detecting the locking tool's switch from the lock position of the locking tool via the safety device's control device.

Since the control device of the safety device is functionally assigned to the loading and unloading equipment, and since the first sensor tool can detect whether the locking tool is set in the lock position or release position, the motor and/or the loading and unloading device can be automatically set against movement, as soon as the locking tool allows access to the walk-on element.

By this, the additional use of a control switch for turning off the motor and/or the loading and unloading device or for setting them against movement may be foregone, as the motor and/or the loading and unloading device will be turned off or set against movement automatically. In this case, the danger of the operating personnel accidentally and/or unintentionally not turning off either the motor or the loading and unloading device prior to accessing the carrier is reduced and the operating personnel's safety upon stepping on the carrier of the loading and unloading equipment is increased.

For instance, the loading and unloading equipment may be one element of a workpiece processing plant.

The carriage body can be directly or indirectly mounted on the carrier. The carrier might have a leading tool that may be similar to rails on which the carriage body's movement can be led along the carrier. In this case, the leading tool and the carrier may possess a shared component or may be designed as components that are separable from each other.

The loading and unloading device's design may be multi-axial or include appropriate axle kinematics with corresponding degrees of flexibility.

The locking tool of the safety device can generally be designed at one's own discretion. Its implementation is simple and inexpensive if the locking tool includes a door-like or plate-like flat structure which, when set in the lock position, extends over the walk-on element in a way that makes it impossible to access the individual stair- or step-like elements of the walk-on element.

In general, the first sensor tool may be designed at one's own discretion, as long as it fulfils the function of detecting the locking tools switch from the lock position. For example, the first sensor tool can be installed directly on the locking tool or on the walk-on element.

It has proven beneficial when the walk-on element is installed on the carrier so that it may or may not be detached and when the carrier includes at least one gathering device in which or on which the walk-on element of the access device is able to be set with at least one setting tool of the safety device.

If the access device is able to be set in a detachable way, it may be stored separate from the loading and unloading equipment, when it is not needed. Thus, a barrier-free space is increased under the carrier or the loading and unloading equipment.

In addition, it is conceivable that the carrier possesses several gathering devices, in which or on which the walk-on element of the access device can be set. In this case, it is possible that the operator, who is in close proximity of a component or an assembly unit that is to be maintained, may access the carrier, whereby long distances to the component to be maintained can be avoided.

The setting tool may include a segment of the walk-on element or a separate component which connects the walk-on element to the carrier's gathering device.

When further developing the last embodiment, it has proven beneficial when then safety device consists of at least one latch element that is installed in or on the setting tool and that may be locked in place in the gathering device and create a rear grip as well as allows for the locking body to be switched from the lock position to the release position while being locked in place in the gathering device and/or when the safety device includes at least one second sensor tool by the means of which the locking in place of the setting tool in the gathering device is detectable and displayable, in particular via a display tool.

The latch element may be powered mechanically or electrically. For instance, the latch element can be pre-positioned into a latched position with the help of tension springs or compression springs and retract towards the walk-on element when inserting the setting tool into the gathering device, for it to, then, return to its pre-positioned, latched position and interlock with the gathering device. Therefore, the latch element may be connected to a release tool which, for example, is controllable at the walk-on element and, in particular, near the ground, in order to be released from the latched position once again. Due to the fact that the locking body is only released upon the successful or set latched position of the setting tool in the gathering device, access to the walk-on element is only allowed if the walk-on element is securely set at the carrier.

The display tool may be a visual or audible display tool. The display tool may, for example, include a light element. This may signal through light in different colours, such as red, that the walk-on element is not set in the gathering body. A light in a different colour, such as green, may signal that the setting tool is latched in the gathering device.

Moreover, it has proven beneficial when the safety device includes at least one railing that is set at the carrier and, most of all, movable and that may be switched from a resting position, in which the railing is—seen diagonally to the direction of movement of the loading and unloading device—without overlap installed at the loading and unloading device, to a supporting position, in which the railing at least partially surrounds an area around the gathering device like a frame.

Due to the railing, the danger of an operator falling off the carrier is reduced.

Since, in a resting position, the railing is installed at the loading and unloading device without overlap (seen diagonally to the direction of movement of the loading and unloading device), an unhindered use of the loading and unloading device is ensured in the railing's resting position, the loading and unloading device is turned off and set against movement when switching the walk-on element from the locking position to the release position. This does not cause the railing to obstruct the loading and unloading device that is turned off or set against movement, when it is in a supporting position.

When further developing the last-mentioned embodiment, it has been proven beneficial, when the railing can automatically or manually be switched from the resting position to a supporting position and set in said positions.

In case the railing can be automatically switched from the resting position to the supporting position and set in said position, this may be done by, for example, the operator's use of a control switch or by switching the locking tool from the locked position into the release position.

The railing may in general be switched from the resting position to a supporting position in any desired way. In this case, it has been proven to be practical when the railing is foldable and/or partially telescopically extendable when switching from the resting position to the supporting position and/or that the railing, when in a resting position, can be installed on the carrier and led along the carrier into the supporting position.

If the railing is foldable and/or partially telescopically extendable when switching from the resting position to the supporting position, the railing, when in a resting position, may be installed in direct proximity to the gathering device. In this case, the railing fits closely to the carrier.

If, in the resting position, the railing may be installed in a resting position on the carrier and may be led along the carrier into the supporting position, the railing can, for example, be installed on an end of the carrier, on which the loading and unloading device does not perform any tasks. Thus, the railing may be simple in its design, which makes its production inexpensive.

Moreover, it is conceivable that the railing encompasses a cage-like segment in the area of the gathering device, which is extends sideways and away from the carrier and forms together with the walk-on element a kind of tunnel in the area of the gathering device that the operator must cross in order to gain access. This leads to the operator being surrounded by the walk-on element on the one hand side and the cage-like segment on the other hand side before reaching the gathering device, whereby the danger of a fall from the walk-on element is reduced further.

It is generally conceivable that the individual components of the loading and unloading equipment is automatically controlled by the control device. For instance, the locking body may be automatically enabled to switch from the locked position to the release position after the latch position of the locking tool in the gathering device has been accomplished successfully. When switching the locking body from the locked position to the release position, the motor may control the loading and unloading device and/or the railing in a way that turns off the motor and the loading and unloading device and sets them against movement, as well as in a way that automatically leads the railing from the resting position into the supporting position.

In order to further increase the safety of an operator, the safety device can include at least one rope- or cable-like flow device extending parallel to the carrier that features one track with space to the carrier, a load-bearing element that is led according to the track and a carabiner-like coupled device that is attached to the load-bearing element and to be fastened to the operator's harness.

In such a case, the flow device may consist of a latchway, a rope or the like. The track may have a rope, which is stretched parallel to the carrier and on which the load-bearing element is freely led.

The load-bearing element can include a carabine or a trolley or the like, on which the load-bearing element may be led. Furthermore, the load-bearing element may consist of a flexible, bendable part, such as a rope or a cable, which is at one end attached to the carabiner, the trolley or the like and at the other end to may be connected to the carabiner-like coupling device.

The load-bearing element is preferably so long that it breaks the fall of an operator, without the operator touching the ground.

Moreover, in the course of one embodiment for the loading and unloading equipment, it may be intended that the safety device consists of at least one control element, through which the locking body, the setting tool, in particular the latch element, the motor, die loading and unloading device and/or the railing can be controlled.

Moreover, it is conceivable that the display tool is installed on the control panel. In this case, the display tool can include visual and/or audible indications and display the status of the relevant components.

The control element may be installed on the walk-on element, on the support structure or entirely flexible.

In order to make work on the carrier easier and to cross the loading and unloading device safely, it has proven beneficial for the safety device to consist of at least one plate-type stepping tool that, at least when in the supporting position of the railing, overlays the loading and unloading device parallel to surface of the carrier facing away from the floor.

The plate-type stepping tool is, in this case, installed at the level of or with a slight distance to the carriage body and creates an essentially flat stepping area for the operator. Thus, the danger of an operator falling or tripping while crossing the loading and unloading device or damaging the loading and unloading device can be reduced.

In order to further increase the safety of working on the carrier, it has proven beneficial for the safety device to consist of at least one surface element with increased roughness, which is installed on the side of the walk-on element, carrier and/or stepping tool facing away from the ground.

The surface element can form a shared component with the walk-on element, the carriers and/or the stepping tool or can be installed as an additional component or an additional coating on the walk-on element, the carrier or the stepping tool. Due to the roughness being increased, it is less likely for an operator to slip.

Furthermore, the task is performed with the help of a procedure for the operation of the safety device of loading and unloading equipment, in particular with at least one of the previously mentioned characteristics, according to the following steps:
a. Detecting (by means of a first sensor tool of the safety device) whether a locking tool of an access device of the loading and unloading equipment blocks the access to the walk-on element, when in a locked position, or allows for access to the walk-on element, when in a released position;
b. Blocking of a motor and/or a loading and unloading device of loading and unloading equipment if the locking tool is set to the release position.

When further developing the procedure, it has been proven beneficial for the procedure to include the following steps:
a. Where required Installing of the stepping tool on a carrier and setting the stepping tool in or on a gathering device of the carrier with the help of a setting tool;
b. Detecting (by means of a second sensor tool) whether the setting tool is latched in the gathering device and release of the locking tool of the walk-on element and/or release of the walk-on element if a latch element of the setting tool is locked in the gathering device;
c. Where required Display of the setting tool's locking in the gathering device by means of a display tool;

The introduction "where required" means that this step is not necessarily required.

In addition, it has been proven beneficial for the procedure to include the following steps:
Switch of an, in particular movable, set railing of the safety device, which is installed at the carrier, from the resting position, in which the railing (seen diagonally to the direction of movement of the loading and unloading device) is installed at the loading and unloading device without overlap, to a supporting position, in which the railing at least partially surrounds an area around the gathering device like a frame.

Further features, details and advantages of the invention will become apparent from the appended patent claims, the drawings and the following description of preferred embodiments of the loading and unloading equipment and the method for operating a workpiece machining system.

BRIEF DESCRIPTION OF THE DRAWINGS

The drawing shows.

DETAILED DESCRIPTION OF THE INVENTION

Figure 1:
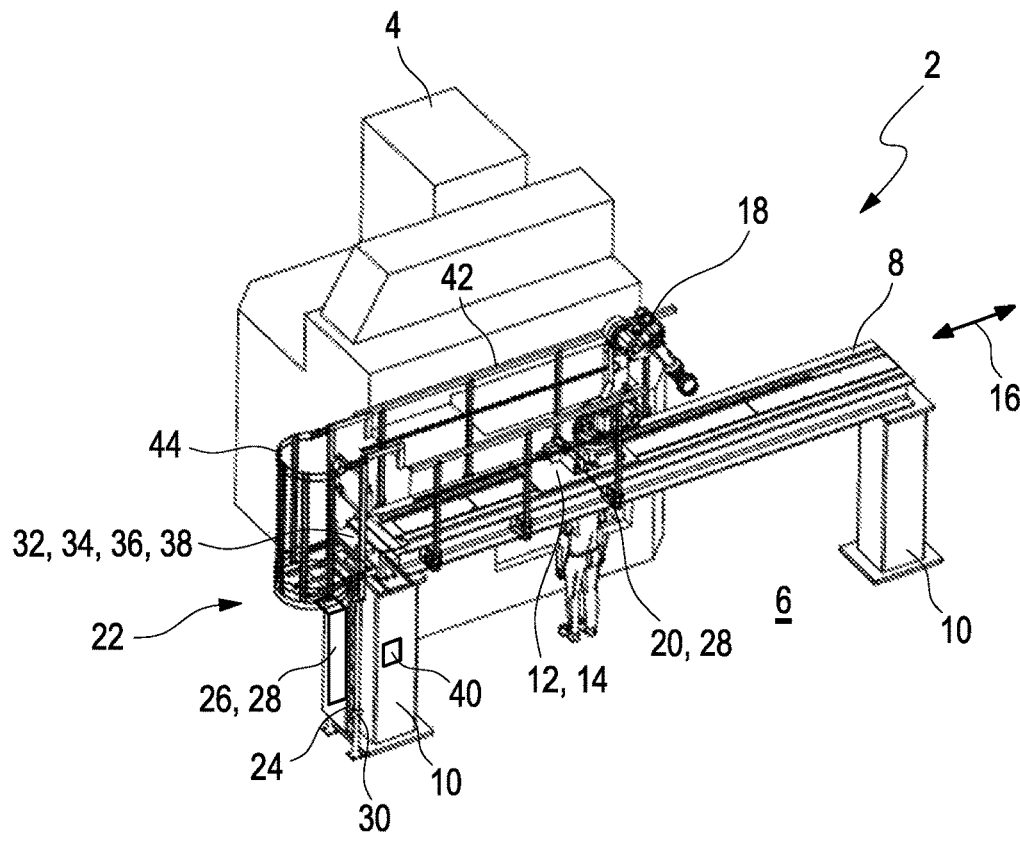
FIG. 1 A perspective side view of an embodiment of the loading and unloading equipment with an access device and the railing in supporting position.
Figure 2:
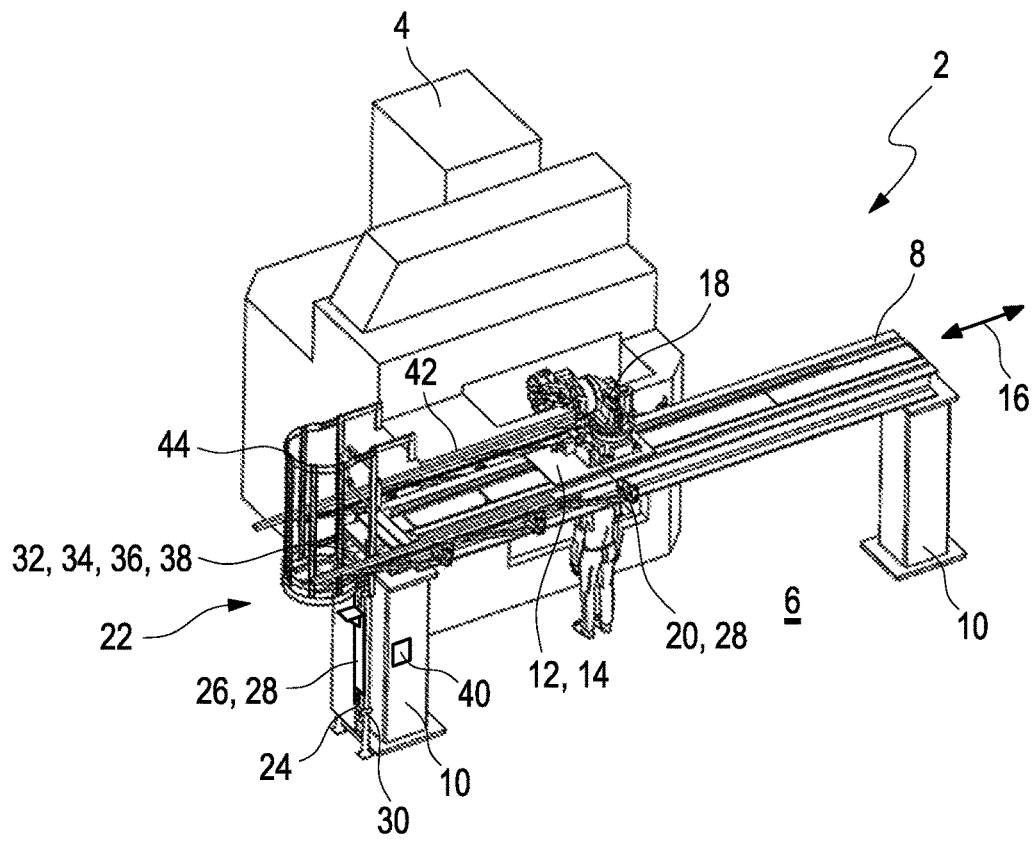
FIG. 2 A perspective side view of the embodiment according to FIG. 1 with the railing in resting position.
Figure 3:
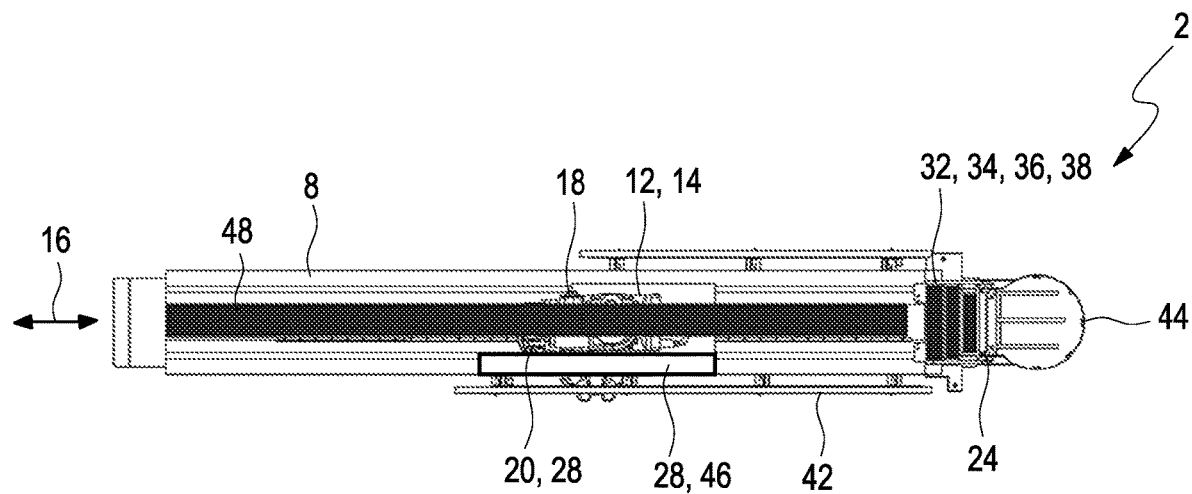
FIG. 3 A top view of the loading and unloading equipment according to FIG. 1.
Figure 4:
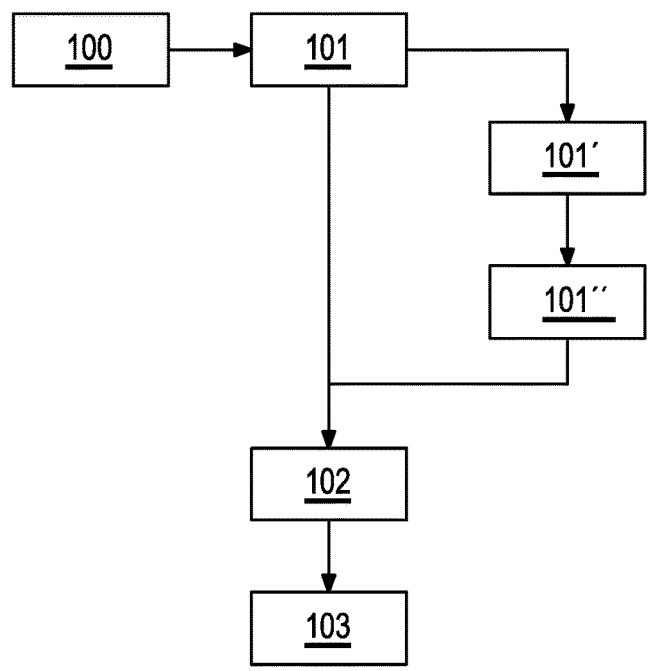
FIG. 4 A schematic flow chart of the procedure in accordance with the invention.

FIGS. 1 to 3 show an embodiment of loading and unloading equipment that is labelled with the reference number 2 as a whole. The loading and unloading equipment 2 may be part of a workpiece processing plant and extend to a number of machining tools 4.

The loading and unloading equipment 2 consists of one carrier 8 that essentially runs parallel to the ground 6. The carrier 8 is set in place above the ground 6 by supporting bodies 10 that extend diagonally to the carrier 8. On the carrier 8 a carriage body 12 is installed on which a motor 14 is set, which moves the carriage body 12 along-side the carrier 8 in a direction of movement 16. A loading and unloading device 18 is set on the carriage body 12. Due to the loading and unloading device 18, it is possible to arrange workpieces, tools or the like in the machine tool 4 or remove them from the machine tool 4.

Moreover, the loading and unloading equipment 2 possesses a control device 20, which at least controls the movement of the motor 14 and/or the loading and unloading device 18.

The loading and unloading equipment 2 further includes an access device 22, which consists of a stair-like walk-on element 24 and a locking tool 26. In operating position, the walk-on element 24 extends from near the ground to at least in the direction of the carrier 8.

FIG. 1 shows the locking tool 26 in a release position, in which the locking tool 26 allows access to the walk-on element 24. Thus, it is possible for an operator to access the walk-on element 24.

FIG. 2 shows the locking tool 26 in a locked position, in which the access to the walk-on body 24 is blocked.

The locking tool 26 and the control device 20 are functionally assigned to a safety device 28. The safety device 28 also includes a first sensor tool 30, with which the locking tool's 26 switch from the locked position to the release position is detectable and that in combined effect with the control device 20 sets the motor 14 and/or the loading and unloading device 18 against movement when detecting the locking tool's 26 switch from the locked position to the release position.

FIGS. 1 to 3 show an embodiment of the loading and unloading equipment 2, in which the access device 22 is detachable from the carrier 8. For this purpose, the carrier 8 consists of a gathering device 32, in which the walk-on element 24 of the access device 22 can be set with a setting tool 34 of the safety device 28. In order to set the access device 22 securely in the gathering device 32, the setting tool 34 consists of a latch element 36 that is locked into the gathering device.

In the embodiment shown in the figures, the safety device 28 also includes a second sensor tool 38, with which the locking of the setting tool 34 in the gathering device 32 is detectable. Moreover, the locking of the setting tool 34 in the gathering device 32 may also be displayed by a display tool 40.

In addition, the embodiment depicted in the figures include a railing 42 of the safety device 28, which, in FIG. 1, is placed in a supporting position, in which an operator that accesses the carrier 8 is supported by the railing 42.

FIG. 2 shows the railing 42 in a resting position, in which the railing (seen diagonally to the direction of movement 16) is placed without overlapping with the loading and unloading device 18. In case of the embodiments shown in the figures, the railing 42 lets itself fold from the resting position into the supporting position.

In addition, the railing 42 consists of a cage-like segment 44, which is positioned at the upper end of the walk-on device 24 and surrounds the gathering device 32 in an arched and/or semicircular way.

FIG. 1 shows the loading and unloading equipment 2, where the locking tool 26 is set in a release position. In this case, the railing 42 is also set in a supporting position.

FIG. 2 shows the loading and unloading equipment 2, where the locking tool 26 is set in a locked position. In this case, the railing 42 is set in a resting position.

FIG. 3 shows a top view of the loading and unloading equipment 2. From FIG. 3 it is apparent that the safety device 28 includes a plate-type stepping tool 46, which, at least in the supporting position of the railing 42, overlays the loading and unloading device 18 parallel to the carrier's 8 surface facing away from the ground. Because of this, an operator is able to safely pass the loading and unloading device 18.

FIG. 3 further shows that the loading and unloading equipment 2 possesses a surface element 48 with increased roughness, which is installed on the access device's 24, the carrier's 8 and the stepping tool's 46 surface that faces away from the ground. Due to this surface element 48, the roughness of the surface is increased, reducing the danger of an operator's slipping when accessing the access device 24, the carrier 8 and the stepping tool 46.

The operating principle of the safety device 28 is explained more detailed with the help of the schematic depiction of a procedure for the operation of the safety device 28 of the loading and unloading equipment 2.

In a first step 101, it is detected (by means of a first sensor tool 30 of the safety device 28) whether a locking tool 26 of an access device 22 is arranged in a way that blocks the access to the walk-on element 24, when in a locked position, or allows for access to the walk-on element 24, when in a released position.

In the following step 102, the motor 14 and/or the loading and unloading device 18 is blocked if the locking tool 26 is set to the release position. This is for example shown in FIG. 1.

If necessary, it is possible to perform a step 100 prior to step 101, in the course of which the stepping tool 24 is placed on the carrier 8 and the stepping tool 24 locked in the gathering device 32 with the help of a setting tool 34.

This step may be required of the stepping tool 24 is detachable from the carrier 8 and must be installed on the carrier 8 before accessing the carrier 8.

You may perform steps 101' to 101" prior to step 102. In case of an interim step 101', the second sensor tool 38 first detects, whether the setting tool 34 is locked into the gathering device 32. Only when it is detected that the setting tool 34 is locked into the gathering device 32, is the locking tool 26 of the walk-on element 24 enabled to switch from the locked position to the release position.

This can be followed up by a step 101", i.a. by showing on a display tool 40 that the setting tool 34 is locked into the gathering tool 32.

Lastly, you may perform a procedural step 103, in the course of which the railing 42 is switched from the resting position (FIG. 2) to the supporting (FIG. 1).

The features of the invention disclosed in the foregoing description, in the claims and in the diagrams, may be essential both individually and in any combination in the implementation of the invention in its various embodiments.

REFERENCE LIST

2 Loading and unloading equipment
4 Machine tool
6 Ground
8 Carrier
10 Supporting body
12 Carriage body
14 Motor
16 Direction of movement
18 Loading and unloading device
20 Control device
22 Access device
24 Walk-on element
26 Locking tool
28 Safety device
30 First sensor tool
32 Gathering device
34 Setting tool
36 Latch element
38 Second sensor tool
40 Display tool
42 Railing
44 Cage-like segment
46 Stepping tool
48 Surface element
100-103 Steps of procedure

The invention claimed is:
1. A loading and unloading equipment comprising:
at least one carrier that runs parallel to the ground,
at least one supporting body extending diagonally or at an angle towards the carrier and setting the carrier in place with space towards the ground,
at least one carriage body that is installed on the carrier, at least one motor that moves the carriage body in a direction of movement along the carrier, at least one loading and unloading device that is set on the carriage body, at least one control device that at least controls the movement of at least one of the motor and the at least one loading and unloading device, and at least one access device that includes at least one walk-on element, which, at least when set to an operating position, extends from near the ground to the carrier, as well as at least one locking tool, which blocks the access to the walk-on element when set to a locking position and which allows access to the walk-on element when set to a release position;

wherein the control device and the locking tool are functionally assigned to a safety device, which includes at least a first sensor tool, wherein a switch of the locking tool from the lock position to the release position is detectable and a setting of at least one of the motor and the at least one loading and unloading device against movement is possible when detecting the switch of the locking tool from the lock position of the locking tool via the control device of the safety device.

2. The loading and unloading equipment in accordance with claim 1, wherein the access device is installed on the carrier so that the access device is attachable to the carrier, wherein the carrier consists of at least one gathering device, on which the walk-on element of the access device is settable with at least one setting tool of the safety device.

3. The loading and unloading equipment in accordance with claim 2, wherein the safety device consists of at least one latch element that is installed on the setting tool and is lockable in place in the gathering device and create a rear grip as well as allows for a locking body to be switched from the lock position to the release position while being locked in place in the gathering device or wherein the safety device consists of at least one second sensor tool which detects and displays the locking in place of the setting tool in the gathering device, in particular via a display tool.

4. The loading and unloading equipment in accordance with claim 1, wherein the safety device consists of at least one railing that is set at the carrier and movable and that may be switched from a resting position, in which the railing is seen diagonally to the direction of movement of the loading and unloading device without overlap installed at the loading and unloading device, to a supporting position, in which the railing at least partially surrounds an area around the gathering device.

5. The loading and unloading equipment in accordance with claim 4, wherein the railing automatically or manually is switched from the resting position to the supporting position and set therein.

6. The loading and unloading equipment in accordance with claim 4, wherein the railing is foldable partially telescopically extendable, or foldable and partially telescopically extendable when switching from the resting position to the supporting position or that the railing, when in a resting position, is installable on the carrier and led along the carrier into the supporting position.

7. The loading and unloading equipment in accordance with claim 1, wherein the safety device consists of at least one flow device extending parallel to the carrier that features one track with space to the carrier, a load-bearing element that is led according to the track and a coupled device that is attached to the load-bearing element and to be fastened to a harness of the operator.

8. The loading and unloading equipment in accordance with claim 1, wherein the safety device consists of at least one control element, through which at least one of a locking body, the setting tool, in particular the latch element, the motor, the loading and unloading device, and a railing can be controlled.

9. The loading and unloading equipment in accordance with claim 1, wherein the safety device consists of a plate-type stepping tool, which at least in the supporting position of a railing, overlays the loading and unloading device parallel to a surface of the carrier facing away from the ground.

10. The loading and unloading equipment in accordance with claim 1, wherein the safety device consists of at least one surface element that increases the roughness, and which is placed on the surface of the walk-on element, wherein at least one of the carrier and a stepping tool faces away from the ground.

11. A method for the operation of a safety device of loading and unloading equipment according to claim 1, comprising the following steps:
 a. detecting using a first sensor tool of the safety device whether a locking tool of an access device of the loading and unloading equipment blocks the access to the walk-on element, when in a locked position, or allows for access to the walk-on element, when in a released position;
 b. blocking at least one of a motor and a loading and unloading device of loading and unloading equipment if the locking tool is set to the release position.

12. The method in accordance with claim 11, further comprising the steps:
 a. where required, installing a stepping tool on a carrier and setting of the stepping tool in or on a gathering device of the carrier with the help of a setting tool;
 b. detecting using a second sensor tool whether the setting tool is latched in the gathering device and release of the locking tool of the walk-on element or release of the walk-on element if a latch element of the setting tool is locked in the gathering device;
 c. where required displaying the locking of the setting tool in the gathering device using a display tool.

13. The method in accordance with claim 11, further comprising following step
 a. switch of an, in particular movable, set railing of the safety device, which is installed at the carrier, from the resting position, in which the railing is installed at the loading and unloading device without overlap, to a supporting position, in which the railing at least partially surrounds an area around the gathering device.

14. The loading and unloading equipment in accordance with claim 5, wherein the railing is foldable partially telescopically extendable, or foldable and partially telescopically extendable when switching from the resting position to the supporting position and/or that the railing, when in a resting position, is installable on the carrier and led along the carrier into the supporting position.

* * * * *